March 7, 1933.  E. W. KRAFT  1,900,567
STADIA TRANSIT
Filed Nov. 24, 1931  2 Sheets-Sheet 1

INVENTOR
EUGENE W. KRAFT
BY ATTORNEY
Bohleber & Ledbetter

March 7, 1933.  E. W. KRAFT  1,900,567

STADIA TRANSIT

Filed Nov. 24, 1931  2 Sheets-Sheet 2

INVENTOR
EUGENE W. KRAFT
BY ATTORNEYS
Bohleber & Ledbetter

Patented Mar. 7, 1933

1,900,567

UNITED STATES PATENT OFFICE

EUGENE W. KRAFT, OF CHICAGO, ILLINOIS, ASSIGNOR TO KEUFFEL & ESSER CO., OF HOBOKEN, NEW JERSEY, A CORPORATION OF NEW JERSEY

STADIA TRANSIT

Application filed November 24, 1931. Serial No. 576,998.

The invention relates to a stadia transit and is particularly directed to the scales and the members carrying the scales for determining the angular inclination of the telescope and for reading vertical and horizontal constants. The invention is an improvement upon the W. L. E. Keuffel Patent No. 1,154,253 which discloses a scale of horizontal constants and a scale of vertical constants by means of which the vertical and horizontal distance may be calculated without the use of formula, charts, tables or slide rules as set forth in the patent.

The three scales described in the patent are provided on the outer edge of a circular ring so that the scale for reading the angular displacement of the telescope cannot extend around the entire circumference or through 360°. Sometimes it is very desirable to be able to read the angularity of the telescope through a complete circle and such a scale of angularity through 360° is not possible in the construction of ring shown in the patent since the scales would interfere with each other.

It is the principal object of the invention to construct a stadia transit in which a scale for angular displacement through a complete circle or through 360° is provided as well as the scale of vertical constants and the scale of horizontal constants.

Other objects of the invention will be more apparent from the following description, taken in connection with the accompanying drawings, showing a preferred embodiment of the invention, in which.

Figure 1:
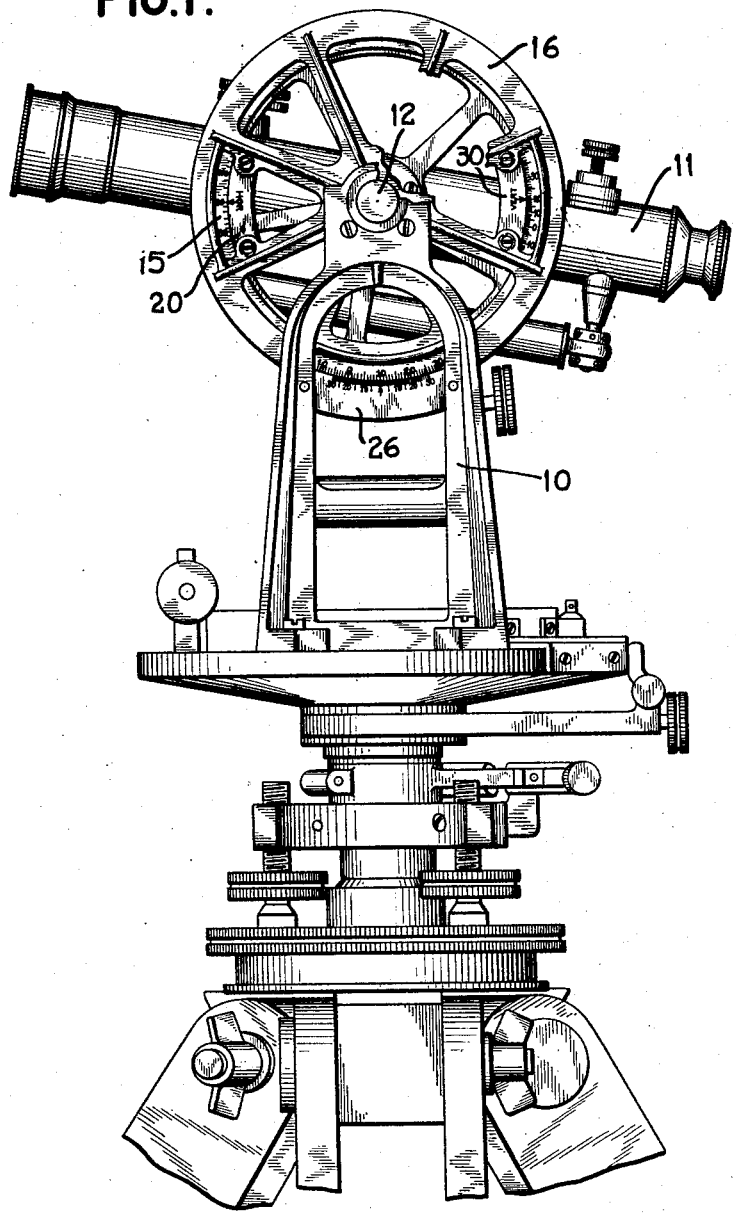
Figure 1 is an elevation of the stadia transit showing the three scales thereupon.
Figure 2:
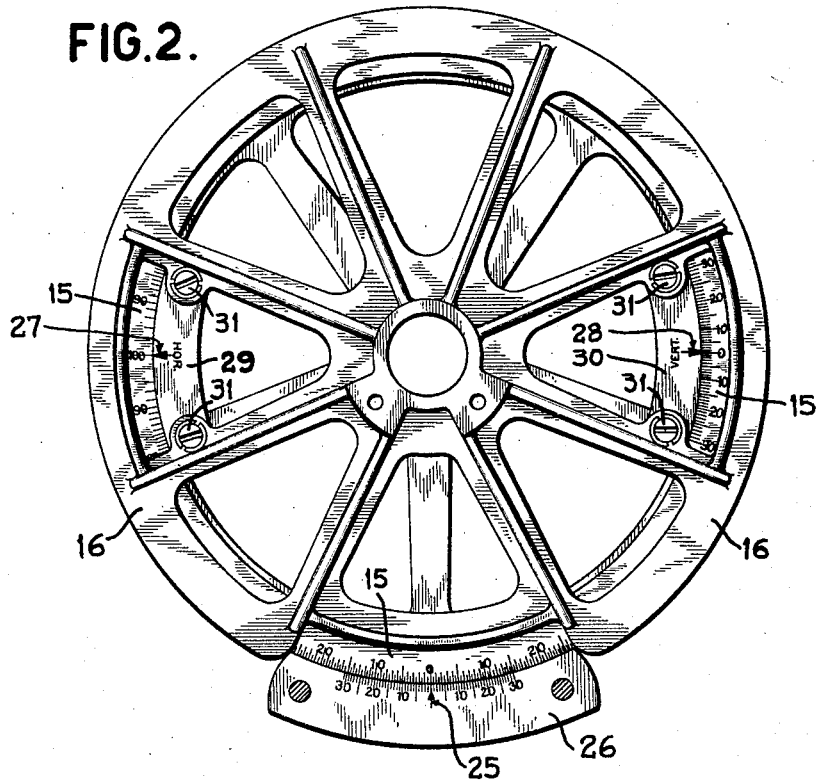
Figure 2 is an enlarged elevational view of the circular ring carrying the three scales and the guard therefor which carries the indexes for the three scales.

The invention is directed to the scales and the members carrying the scales which enable the angular position of the telescope to be read when taking stadia readings. When the telescope is horizontal, the distance between the rod and the instrument and the elevation of the rod relatively to the instrument may be read directly from the stadia rod. When, however, the position of the rod is such that the telescope must be tilted or angularly displaced in order to place the stadia lines on the rod, the distance between the rod and the instrument and the elevation of the rod with respect to the instrument cannot be read directly but must be corrected. The correction involves trigonometric calculations and the horizontal and vertical constants scales eliminate these calculations by providing directly a constant by which the correction can be made by simple arithmetical calculation.

The stadia transit comprises a support 10 having the usual adjusting, leveling and scale mechanisms ordinarily carried by transits. The support 10 carries a pivot 12 upon which a telescope 11 is mounted. The pivot enables the telescope to be tilted as is well known in the art. The telescope 11 is provided with the usual stadia wires. Since these parts comprise no part of this invention, they will not be described in further detail.

The transit carries a pair of members, one of which is a circular ring 15 and the other member is a guard member 16 which covers the greater portion of the circular ring 15. One of the members, preferably the guard 16, is stationary and the other member is secured to the telescope and is movable therewith. The scales are provided in order to measure the angularity of the telescope and to indicate the horizontal and vertical constants which depend upon the angularity of the telescope. The scales are provided upon one member for the sake of convenience, etc. It is clear that these parts may be reversed and that the circular ring may be carried with the support and the guard member may be carried with the telescope if desired. The preferred construction, however, is as described above, in which the ring carrying the scales is movable with the telescope.

Figure 3:
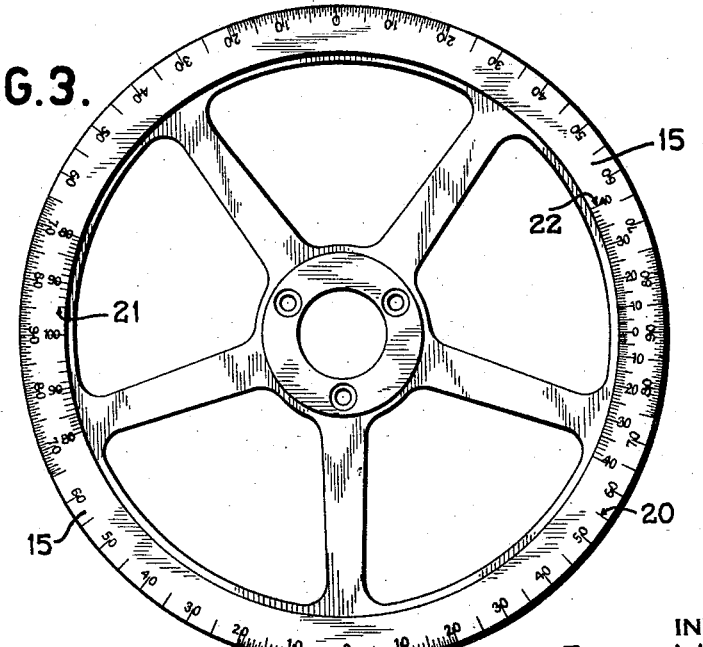
Figure 3 is an enlarged elevational view of the circular ring carrying the three scales.

The circular ring 15 shown in Figure 3 carries upon its outer edge a scale 20 extending completely around the ring so that angular readings throughout 360° may be made. A second scale 21 is carried upon a portion of the inner edge of the circular ring 15 and a third scale 22 is provided upon another portion of the inner edge of the circular ring. The scales 21 and 22 determine the horizontal and vertical constants mentioned and described hereinbefore. It is clear that these readings may be placed anywhere upon the inner edge of the circular ring 15, although it is more convenient to have them in the left and right hand quadrants of the ring.

It will be observed that in the construction described a scale of angular displacement of the telescope throughout an entire circumference is provided upon one of the members 15 or 16 carried by the transit. An index 25 is carried by the other member by which the angular displacement of the telescope may be read upon the scale. The index 25 is carried upon an index plate 26 secured to the member or guard 16 and has a vernier scale for more accurate reading of the angular position as is known to the art.

It will be noted that the member 15 carries a horizontal and vertical constants scale 21 and 22 and that the other member carries indexes 27 and 28 by which the readings upon the horizontal and vertical constants scales may be read. These indexes 27 and 28 are carried upon plates 29 and 30 respectively, which are secured to the member by means of the screws 31 so that the indexes may be adjusted accurately with relation to the scales.

It is immaterial whether the angular displacement scale 20 is upon the inner or outer edge, but that this scale may be changed in its position to be upon the inner edge and the vertical or constants scales may be positioned upon the outer edge. The outer edge of the circular ring, however, provides a longer peripheral dimension for the graduations of the scale and hence would enable more accurate determination of the reading upon that scale which occupies the outer edge. Again the scale 20 of angular displacement of the telescope and the scales 21 and 22 of horizontal and vertical constants need not necessarily be provided upon a single ring. Those parts of the ring 15 which carry the scales 21 and 22 graduated in horizontal and vertical constants and their respective indices are in effect cooperating elements for determining their respective constant readings. The scales upon a single ring, however, is the simpler construction.

Various modifications will occur to those skilled in the art in the configuration, composition and disposition of the component elements going to make up the invention as a whole, as well as in the selective combination or application of the respective elements, and no limitation is intended by the phraseology of the foregoing description or illustrations in the accompanying drawings, except as indicated in the appended claims.

What is claimed is:
1. An instrument of the class described comprising a support, a telescope carried thereby provided with stadia wires, means mounting the telescope for angular adjustment, cooperating members including a circular ring in which one member is carried by the support and the other member is carried and angularly adjustable with the telescope, a scale of angular displacement throughout an entire circumference upon one edge of the circular ring, two scales upon the other edge of the circular ring one of which is graduated in terms of horizontal constants and the other in terms of vertical constants varying with each angle of inclination of the telescope, and an index for each of the scales on the other member.

2. An instrument of the class described comprising a support, a telescope carried thereby provided with stadia wires, means mounting the telescope for angular adjustment, a circular ring carried by and angularly adjustable with the telescope, a scale of angular displacement throughout an entire circumference upon one edge of the circular ring, two scales one of which is graduated in terms of horizontal constants and the other in terms of vertical constants varying with each angle of inclination of the telescope carried upon the other edge of the circular ring, a guard carried by the support and covering the angular adjustment scale leaving a section thereof visible, and an index for each of the scales on the guard.

3. An instrument of the class described comprising a support, a telescope carried thereby provided with stadia wires, means mounting the telescope for angular adjustment, a circular ring carried by and angularly adjustable with the telescope, a scale of angular displacement throughout an entire circumference upon the outer edge of the circular ring, two scales one of which is graduated in terms of horizontal constants and the other in terms of vertical constants varying with each angle of inclination of the telescope carried upon the inner edge of the circular ring, a guard carried by the support and covering the major part of the circular ring with a section exposed for each scale, and an index for each of the scales on the guard.

In testimony whereof I affix my signature.
EUGENE W. KRAFT.